United States Patent [19]
Stiegler et al.

[11] Patent Number: 5,935,214
[45] Date of Patent: Aug. 10, 1999

[54] METHOD FOR TRANSMITTING SOURCE DATA AND CONTROL DATA IN A COMMUNICATION SYSTEM WITH A RING STRUCTURE

[75] Inventors: Andreas Stiegler, Ettlingen; Patrick Heck, Durmersheim; Herbert Hetzel, Schwaigen; Hans-Peter Mauderer, Gaggenau, all of Germany

[73] Assignees: Silicon Systems GmbH Multimedia Engineering, Karlsruhe; Becker GmbH, Karlsbad, both of Germany

[21] Appl. No.: 08/949,724

[22] Filed: Oct. 14, 1997

[30] Foreign Application Priority Data

Oct. 11, 1996 [DE] Germany .......................... 196 42 258

[51] Int. Cl.[6] ....................................... H04J 3/04
[52] U.S. Cl. .................... 709/238; 709/251; 370/389; 370/330; 370/351
[58] Field of Search ................. 395/200.81, 200.68; 370/389, 330, 351; 709/251, 238

[56] References Cited

U.S. PATENT DOCUMENTS

| | | | |
|---|---|---|---|
| 4,958,344 | 9/1990 | Scott | 370/535 |
| 4,987,572 | 1/1991 | Scott | 370/538 |
| 5,361,261 | 11/1994 | Edem et al. | 370/445 |
| 5,490,168 | 2/1996 | Phillips et al. | 375/224 |

*Primary Examiner*—Krisna Lim
*Attorney, Agent, or Firm*—Herbert L. Lerner; Laurence A. Greenberg

[57] ABSTRACT

A method for the common transmission of digital source data and control data between data sources and data sinks. The data sources and data sinks are subscribers in a communication network with a ring structure. The source data and control data are transmitted in a format which prescribes a pulsed sequence of individual bit groups of identical length. Specific bit positions in each of the bit groups are reserved for source data and control data. The transmission is in a continuous data stream synchronous with a clock signal. An arbitrarily large contiguous region of the bit positions can be reserved for the source data within a bit group for data which are transmitted in data packets. Each of the data packets has a start with a subscriber address and a defined length.

27 Claims, 6 Drawing Sheets

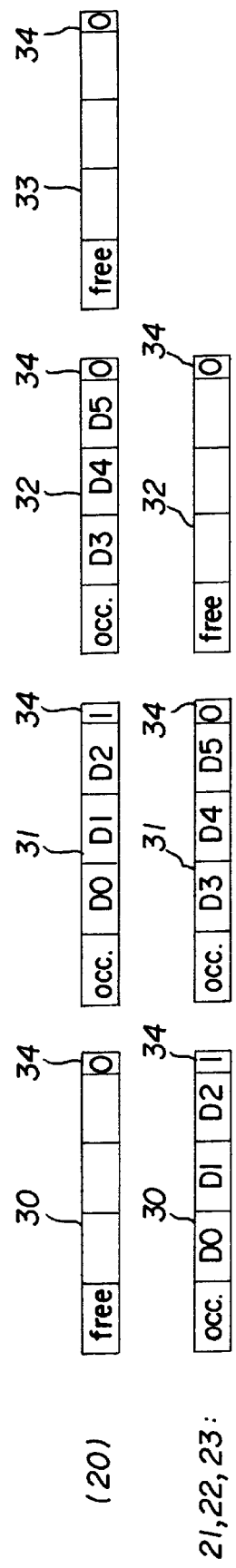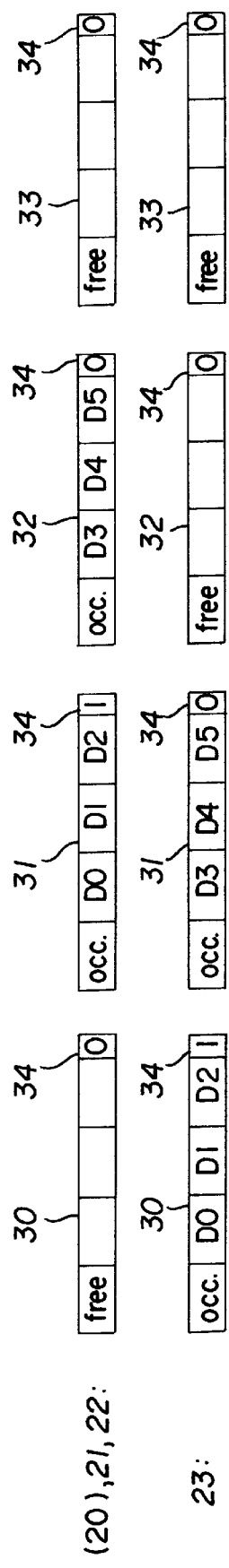

METHOD FOR TRANSMITTING SOURCE DATA AND CONTROL DATA IN A COMMUNICATION SYSTEM WITH A RING STRUCTURE

BACKGROUND OF THE INVENTION

1. Field of the Invention

The invention relates to a method for the common transmission of digital source data and control data between data sources and data sinks, which are subscribers to a communication network with a ring structure, the source data and control data being transmitted in a format which prescribes a pulsed sequence of individual bit groups of identical length in which specific bit positions are reserved in each case for source data and control data, which are transmitted in a continuous data stream synchronous with a clock signal. The clock signal is generated by a single subscriber. All other subscribers are synchronized with this clock signal. Data transmission methods which are purely packet orientated such as, for example, the ATM method, i.e., asynchronous transfer methods, are to be distinguished from these. The invention is also directed towards specific applications of the novel method in a domestic communication system and a communication system for motor vehicles.

Methods of this type are used wherever electric and electronic devices of different types which are intended to exchange information with one another are mutually networked, often in a complicated way, by means of data lines. Thus, for example, in audio applications such a method can be used to control communication between mutually networked data sources, on the one hand, such as CD players, radio receivers and cassette recorders, for example, and data sinks connected thereto, on the other hand such as, for example, amplifier/loudspeaker combinations. Certain devices can thereby be a data source and a data sink (e.g. cassette recorder/player).

2. Description of the Related Art

It has become known heretofore from European patent disclosure EP-A-0 725 522 to interconnect different types of network subscribers by optical fibers in such a way that the data stream passes each subscriber sequentially. An optical communication network with a ring structure is then produced which has particular advantages, in particular for mobile applications, for example in motor vehicles, and domestic applications, for example in multimedia networks. In order to be able to transmit data between a multiplicity of interconnected subscribers in such a network, the positional region within a bit group which is reserved for the source data transmitted in a continuous data stream can be subdivided into a plurality of component bit groups of identical length. It is thereby possible for the source data allocated to each component bit group to be assigned to a specific subscriber as a function of the control data. The component bit groups form channels which are available in each case to a specific subscriber for an unspecified time.

Data transmission in a data stream synchronous with a clock signal, as it is typical of the methods mentioned, permits simple connection to data sources and data sinks, which likewise transmit and receive continuously. This is the case with many audio and video devices, for example. In addition, the current quality requirements in the audio field, for example, can be met with acceptable outlay generally only given synchronous data transmission.

In principle, those methods can also be used to transmit data which originate from a device which supplies data in an asynchronous mode such as, for example, a fax machine or a CD-ROM drive. It is necessary for that purpose to synchronize the data delivered in bursts with the clock signal, and to transmit the synchronized data via a channel which is formed by specific bit positions and is assigned to the receiver of the data. During the time in which it is assigned to the receiver, the channel is not available for any other data. Since the assignment and rerelease of channels takes a relatively long time, a substantial amount of transmission capacity is sacrificed. Further transmission capacity is sacrificed by short gaps between individual bursts, which do not permit a channel release in the meantime.

The above-noted EP-A-0 725 522 proposes to transmit fax data or other unformatted, i.e., uncoded, data via so-called transparent channels which are provided in the regions reserved for the control data. These channels, however, are then available only for a very specific purpose, and the above-mentioned disadvantages are encountered. Again, the transmission capacity of the permanently reserved transparent channels is limited by virtue of the system.

SUMMARY OF THE INVENTION

It is accordingly an object of the invention to provide a method for data transmission in a communication network with a ring structure, which overcomes the above-mentioned disadvantages of the prior art devices and methods of this general type and which permits efficient transmission both of data transmitted continuously and of data transmitted in bursts.

With the foregoing and other objects in view there is provided, in accordance with the invention, a method for the common transmission of digital source data and control data between data sources and data sinks, which are subscribers to a communication network with a ring structure. The method comprises the steps of:

transmitting source data and control data in a continuous data stream synchronized to a clock signal and in a format which prescribes a pulsed sequence of individual bit groups of equal length in which specific bit positions are reserved for source data and control data;

defining data packets each having a start and a defined length, and carrying a subscriber address;

reserving an arbitrarily large contiguous region of the bit positions for the source data within a bit group and transmitting the data packets within the contiguous region.

In other words, the objects set for the method are satisfied by allowing an arbitrarily large contiguous (coherent) region of the bit positions to be reserved for the source data within a bit group for data which are transmitted in data packets which each have a start and a defined length and which are assigned a subscriber address.

The size of the region for the data which are transmitted in data packets can be set in dependence on the requirement of the respective application. For example, in a communication system which contains only continuously operating data sources, there is initially no need at all to provide space for data in packets. If a fax machine or a CD-ROM drive, for example, is added to the system, this device will have available a sufficiently large region of bit positions for the source data present in packets. If the system has a plurality of such sources added, less than the sum of the individual space requirements generally needs to be reserved, since the data packets of one source which are identified by a unique subscriber address can be transmitted to another source by using gaps between the data packets. This fundamental advantage of packet-orientated transmission methods is therefore achieved even in the case of the transmission method according to the invention, which is fundamentally synchronous.

A source of data packets writes successive bits of a data packet to be transmitted preferably in mutually adjacent bit positions which are reserved for the data that are transmitted in data packets. In this case, these data are synchronized with the clock pulse of the communication network. Since, however, the data transmitted in packets are asynchronous until entering the network, they will also be denoted below as asynchronous data for the sake of simplicity, as distinct from the source data, which are transmitted in a continuous data stream without a defined length and are also denoted as synchronous data.

According to a preferred embodiment, the subscriber address is transmitted with the start of the data packet with the asynchronous data. This permits simple, cost-effective and reliable decoding of the address, and thus reliable transmission of the asynchronous data from their source to their sink, which is determined by the subscriber address.

In the preferred embodiment of the invention, just like the bit positions for the asynchronous data, the reserved bit positions for the source data which are transmitted in a continuous data stream form in each case a contiguous region, the two regions for the synchronous and the asynchronous data adjoining one another. The two regions together preferably occupy a fixed number of bit positions within a bit group. The region for synchronous data can, in turn, be subdivided into a plurality of component bit groups, in order to form a plurality of transmission channels for synchronous data.

The boundary between the two regions can be set in accordance with the current network configuration, as described above. In accordance with an added feature of the invention, the boundary between the region for the source data (continuous data stream) and the region for the data (transmitted in data packets) is set in real-time (during ongoing operation) in accordance with the transmission capacities for synchronous or asynchronous data currently required. Synchronous data are preferably processed with priority in this case. This means that an ongoing audio operation, for example, is in no case interrupted when a data-intensive navigation message is to be transmitted by an 8× CD-ROM drive, but the transmission rate for the asynchronous data is reduced in accordance with the transmission capacity still available.

The available total transmission capacity can be utilized optimally at any point in time owing to the dynamic division of the region for source data in the bit groups. The size of the regions or the position of the boundary between the two regions for synchronous and asynchronous data can be specified in a data field which is formed by specific bit positions in each bit group. Each subscriber can easily determine the end of the synchronous data field and the start of the asynchronous data field from the information contained in that data field.

In accordance with an additional feature of the invention, 64 bytes are used for a complete bit group. Sixteen successive bit groups are combined in each case to form a block. As known in the pertinent art, in each bit group, within the regions reserved for the control data, it is possible to provide a data field as preamble, in particular for identifying the start of the bit group and, if appropriate, for identifying the start of a block or for identifying an assignment between partial bit groups (component bit groups) and specific subscribers.

Sixteen control bits which can be used to transmit control messages are provided within the regions reserved for the control data. The control bits of several successive bit groups (e.g. 16) are combined to form a control message.

Sixty bytes of a bit group are respectively provided for source data. Because of this large number of bytes, it is not necessary, as in the so-called SPDIF format (Sony/Philips digital-interface-format), which has become accepted as transmission format with the development of CD players, to provide separate bit groups for left-hand and right-hand audio channels. Instead, it is possible for the left-hand and right-hand audio channels to be respectively assigned to a transmission channel formed by a component bit group. Nevertheless, data can easily be converted from the SPDIF format into the format according to the invention, and vice versa.

In accordance with another feature of the invention, a specific bit position is allocated a parity identifier for the purpose of error detection in each bit group. The parity check is defined within the regions reserved for the control data. Furthermore, in each bit group, within the regions reserved for the control data, a data field comprising a plurality of bits (e.g. six bits) is provided which contains a numerical value corresponding to the position of a subscriber in the annular communication network. This numerical value enables each subscriber to detect its position in the ring easily, and this is useful for time-critical applications.

The coding on the individual bits is preferably performed by means of so-called biphase coding. In this way, the clock signal, encoded in the data signal, can be transmitted together with the latter inside the network. The clock pulse is preferably generated by any network subscriber which operates as a clock pulse generator, the remaining network subscribers operating synchronously with the clock pulse generator by being matched, for example, via PLL circuits to the received clock pulse.

A data packet which contains more bit positions than the region of a bit group which is reserved for the data which are transmitted in data packets can be transmitted in the regions, reserved for the data packets, of a plurality of successive bit groups. In order to indicate this to the receiver of the data packet, the novel method provides for a flag to be set which comprises one or more specific bit positions within the regions reserved for the control data. Each subscriber which finds this flag set in a bit group may not write into the regions of the next bit group which are reserved for asynchronous data. Each subscriber which is currently receiving detects with the aid of the set flag that transmission has not yet been terminated, and still does not confirm receipt.

In a communication network with a ring structure, each subscriber copies the data stream immediately to the next subscriber. During reception and transmission of the data signals by a subscriber, if appropriate with processing of the data in the subscriber, however, a short delay is produced which adds up to an appreciable delay after the traversal of a multiplicity of subscribers. In order to avoid data confusion or data losses on the basis of such time shifts, the clock pulse generator extracts the data to be transmitted from each bit group arriving at the clock pulse generator and copies them into the bit group following thereupon, with the result that a delay is produced in a complete traversal of the ring which corresponds precisely to the temporal length of a bit group. It is therefore necessary, for example, for control messages which are associated with the boundaries of blocks and bit groups, to make arrangements so that the control message is detected as such even after the clock pulse generator has been passed. A suitable method for this is known from the European patent disclosure EP-A-0 725 519. The delay in the clock pulse generator is not a problem per se for the data packets in the transmission method according to the invention, which are not associated either with the boundaries of blocks or the boundaries of bit groups, and have an address. However, it must be ensured that the transmitter of a data packet extracts the latter actively from the data stream or rereleases the space occupied by the data packet after it has arrived at it again with a bit group delay when no further data packets are to be transmitted (if there are still data to be transmitted, it suffices when the transmitter overwrites the data sent so far). Otherwise, the occupied bit group would circulate forever in the network.

In accordance with again another feature of the invention, the occupation of the asynchronous region of a bit group with data is identified by providing a free/occupied identifier at the start of each asynchronous region. This identifier is set to "occupied" by the transmitter of a data packet while it is transmitting data, and reset to "free" after the transmitter has transmitted the last part of its data. Thereafter, the bit group is available again to all transmitters for asynchronous data in the network.

An alternative possibility of preventing an occupied bit group from circulating forever in the network consists in a specific subscriber, preferably the clock pulse generator, providing each data packet, which passes it or which it transmits itself, with a flag. The clock pulse generator deletes the data packet or cancels a corresponding occupied identifier when it detects two data packets with the same flag.

The invention provides a data transmission method for synchronous and for asynchronous data which is compatible with conventional synchronous systems, without sacrificing in transmission capacity. As a result, the transmission rate itself can be increased even when the clock frequency can no longer be increased without generating radiated interference. The latter, of course, can be suppressed only with very considerable outlay.

At the same time, the data transmission method according to the invention is particularly economic. Although buffers are required for feeding asynchronous data into the network, relatively few buffer memories are required because of the ability of the data transmission format according to the invention to adapt to the current conditions in the system.

For the above reasons, the method according to the invention is advantageously used, in particular, in stationary domestic communication systems and in mobile communication systems in motor vehicles.

In accordance with a concomitant feature of the invention, the network is wired with optical fibers between the individual subscribers which permit high data transmission rates. In the case of a communication system in a motor vehicle, moreover, the low weight of optical fibers is particularly advantageous. However, the invention is also suitable for purely electric communication ring-networks in which the line segments are coaxial cables, for example.

Other features which are considered as characteristic for the invention are set forth in the appended claims.

Although the invention is illustrated and described herein as embodied in a method for transmitting source data and control data in a communication system with a ring structure, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a diagram of a data packet according to FIG. 3 as it is transmitted and received, respectively, by the various network subscribers of FIG. 2;

FIG. 6 is a diagram of a data packet according to FIG. 5 as it is transmitted and received, respectively, by the network subscribers of FIG. 2.

DESCRIPTION OF THE PREFERRED EMBODIMENTS

Figure 1:
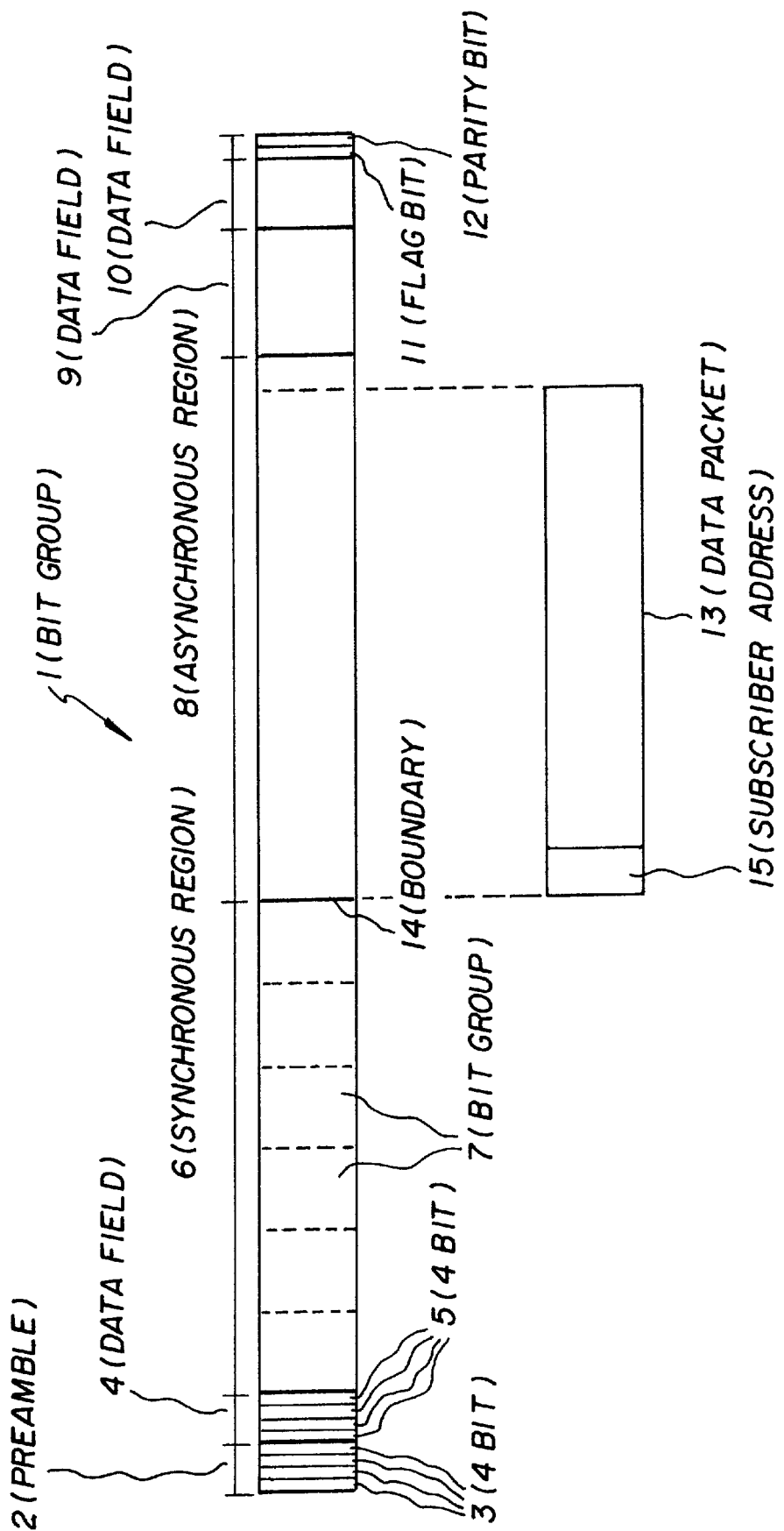
FIG. 1 is a timing diagram of the data transmission format, according to the invention, in a ring-shaped communication network.

Referring now to the figures of the drawing in detail and first, particularly, to FIG. 1 thereof, there is seen a bit group 1, also termed a frame. The bit group 1 comprises 64 bytes, which is 512 bits. This is an even multiple of the lengths of bit groups in known transmission formats for synchronous data, in particular SPDIF format or the format known from the above-mentioned EP-A-0 725 522. Full compatibility is ensures with these formats because of the simple convertibility.

The bit group 1 contains a preamble 2 which comprises four bit positions 3. The preamble 2 permits the PLL circuit of a subscriber to lock on to a received clock pulse. Sixteen bit groups 1 are combined in each case to form a block, the first preamble 2 of each block containing a special block identifier bit.

A data field 4 adjoins the preamble 2 which comprises four bit positions 5 and whose function will be explained further below.

A region 6 for synchronous data adjoins the data field 4. The region 6 can be subdivided in a known way into a plurality of component bit groups 7 of identical length which are assigned in each case to a specific subscriber. The assignment between the component bit groups 7 and the respective subscribers is fixed in the preamble 2.

A region 8 for asynchronous data adjoins the region 6 for synchronous data. The region 6 for synchronous data and the region 8 for asynchronous data together occupy 60 bytes of the bit group 1. The total transmission capacity of the network for synchronous and asynchronous source data is formed by these 60 bytes. The length of the region 8 for asynchronous data can be 0, 4, 8, . . . 56 or 60 bytes, and is fixed by a value ASY (ASY=0, 1, 2, . . . 15) which is stored in the region 4 preceding the region 6 for synchronous data.

The region 6 for synchronous data thus comprises 60–(4× ASY) bytes. The region 8 for asynchronous data is followed by a data field 9, with a size of 16 bits (2 bytes), for control bits. The control bits of a block, i.e., 32 bytes or 192 bits, form a control message.

A data field 10 with 6 bits adjoins the data field 9 for control bits. A subscriber generating clock pulses, or a clock pulse generator, writes a "0" into the data field 10, and the value in the data field 10 is increased by one by each following subscriber in the ring, with the result that each subscriber—in this case a maximum of 64 subscribers—has direct knowledge of its position in the ring.

The data field 10 is followed by a single bit position 11 which indicates whether a data packet in the region 8 for asynchronous data is continued in a bit group following the bit group 1 or not. The bit position 11 is followed by a bit position 12 for a parity bit for error detection.

The regions 6 and 8 of each bit group 1 are reserved for synchronous or asynchronous source data, and the data fields 2, 4, 9, 10 and two individual bit positions 11 and 12 are reserved for synchronous control data.

It will be appreciated that the division of the bit group 1 is not illustrated true to scale for the purpose of ensuring a detailed representation of individual bit positions.

A data packet 13 which is to be transmitted over the network by a subscriber operating in a packet-orientated fashion is inserted into the region 8 for asynchronous data in such a way that it starts at the boundary 14 between the region 6 for synchronous data and the region 8 for asynchronous data, as represented by means of dashed lines. The data packet 13 contains a header region 15 with the address of a receiver, connected to the network, of the data packet 13. If the transmitting subscriber is a device which outputs data packets without addresses, an address is to be added to each of these data packets. This can easily be carried out in an interface between the subscriber and the network.

In the example represented in FIG. 1, the data packet 13 is somewhat shorter than the region 8 for asynchronous data, so that it can be transmitted in one single bit group 1. Where a data packet is longer than the region 8 for asynchronous data in one bit group 1, the rest of the data packet is transmitted in the bit groups following the bit group 1 and, if necessary, in further bit groups. This division is indicated by the flag at the bit position 11. The transmission of a data packet which is longer than the region 8 for asynchronous data in a bit group 1 is explained in detail further below with reference to FIGS. 2 to 7.

The dynamic management of the boundary 14 between the region 6 for synchronous data and the region 8 for asynchronous data is explained with the aid of the following example.

In an annular communication network in a motor vehicle there are interconnected via optical fibers: a radio receiver, a CD player, a mobile telephone, an input/output unit for speech, a navigation system, which comprises a GPS receiver and an 8× CD-ROM drive as database for map material, a plurality of amplifier/loudspeaker combinations, and a viewing screen.

It may be assumed that initially only the radio receiver and the amplifier/loudspeaker combinations are active in the communication network, and that initially 60 bytes are reserved for transmitting synchronous source data. In other words, the region 8 for asynchronous data comprises zero bytes. The audio data from the radio receiver are transmitted via some of the channels formed by the component bit group 7 to the amplifier/loudspeaker combinations, the majority of the 60 bytes of transmission capacity remaining free.

If the navigation system, for example, is now activated, the region 6 for synchronous data is automatically reduced to such an extent that just enough transmission capacity remains for the audio data and for video data from the navigation system to the viewing screen. The region 8 for asynchronous data is correspondingly enlarged so that a comparatively great capacity is available for the data-intensive packet-oriented communication between the navigation system and the CD-ROM drive. Synchronous source data enjoy priority over asynchronous data, however. That is to say, if a call has in the meantime arrived at a telephone with synchronous operation, the region 6 for synchronous data is automatically enlarged so as to accommodate the added synchronous data transfer.

Figure 2:
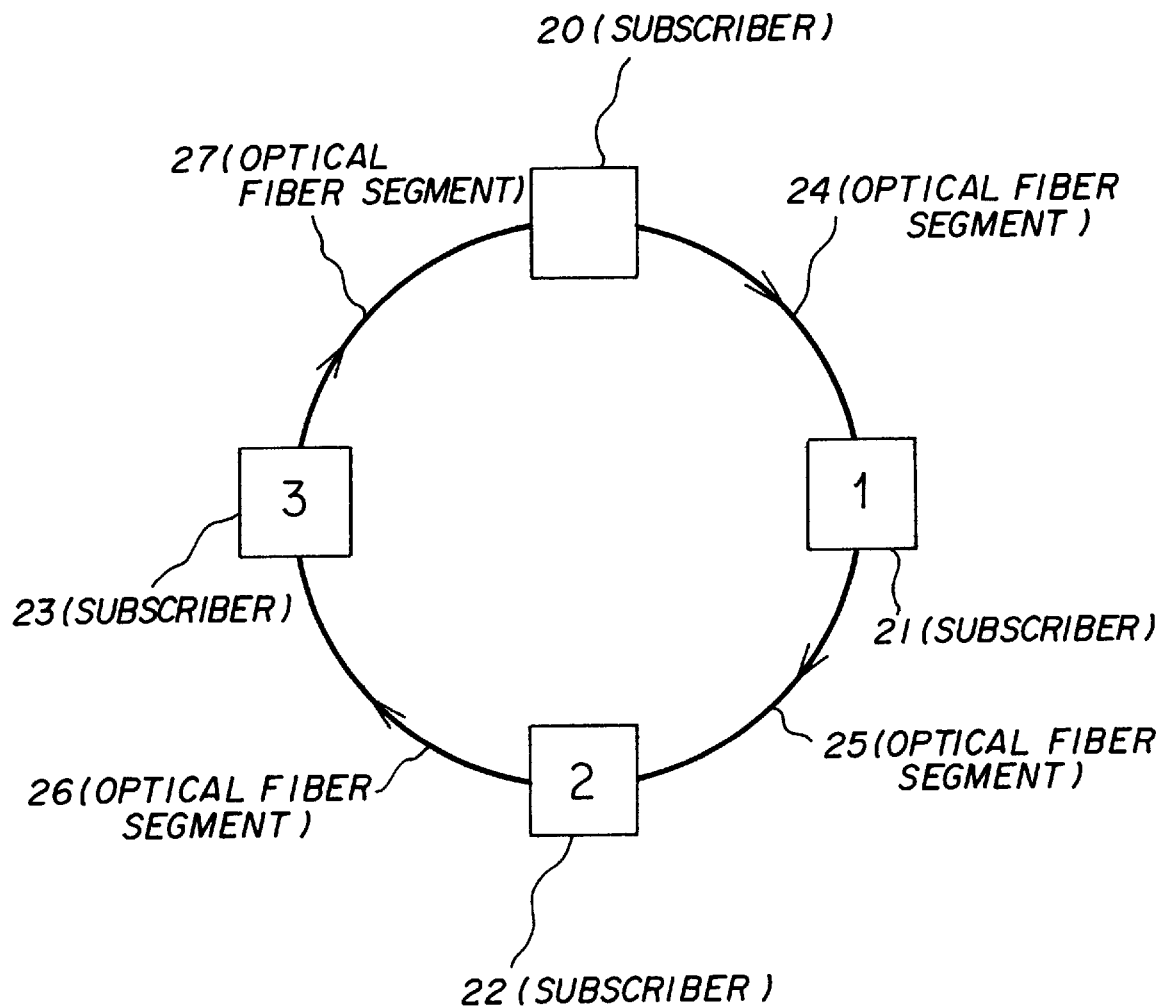
FIG. 2 is a schematic view of a ring-shaped network with four network subscribers.

FIG. 2 shows a ring-shaped or annular network with a subscriber 20 used as clock pulse generator and three further subscribers 21, 22 and 23. The four subscribers 20, 21, 22 and 23 are interconnected annularly via optical-fiber segments 24, 25, 26 and 27. The physical direction of the data transmission is represented by arrows on the optical-fiber segments.

Figure 3:
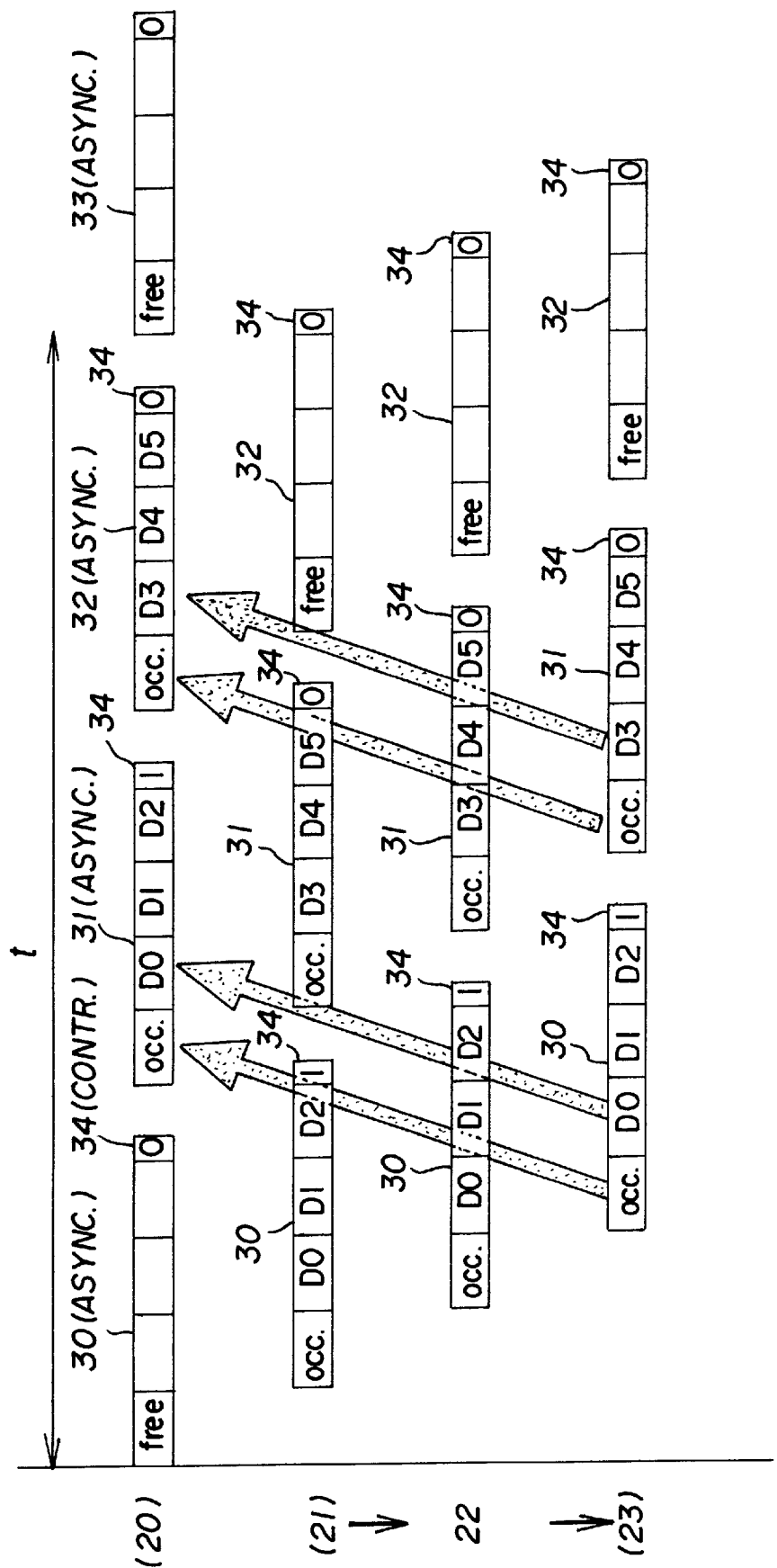
FIG. 3 is a timing diagram representing the transmission of a data packet from one network subscriber to another network subscriber of the network of FIG. 2.

FIG. 3 represents a transmission of asynchronous data from the subscriber 21 to the subscriber 23. The transmission, therefore, does not traverse the clock pulse generator 20. The clock pulse generator 20 transmits bit groups at specific time intervals, four regions 30, 31, 32 and 33 for asynchronous data from four successive bit groups being illustrated in FIG. 3. The region 30 transmitted by the clock pulse generator 20 is empty, and this is indicated by a "free" identifier immediately at the start of the region 30. The subscriber 21 detects that the region 30 is free, and checks its own transmit status. In the case of a transmit request, the subscriber 21 identifies the region 30 as occupied (identifier "occ.") and immediately begins to send an address D0 and data D1 and D2 via the region 30. In the example shown here, the dataset to be transmitted is greater than the number of free bytes which is contained in a region for asynchronous data of a bit group, for which reason the subscriber 21 sets a bit 34 to "1". The bit 34 corresponds to the bit position 11 in the bit group format of FIG. 1, but is illustrated here immediately adjacent the region 30 for reasons of clarity. The bit 34 set signals to all further subscribers that the data packet is continued in the next bit group or the region thereof for asynchronous data. The downstream subscribers then simply do not attempt to write into this region or are not allocated this region if the allocation is performed from a control center. Furthermore, the set bit 34 signals to the receiver of the data packet—here the subscriber 23—that it must remain ready to receive beyond the bit group boundary.

The subscriber 22 detects the occupied region 30, checks the address D0, detects that there is no correspondence and behaves in a transparent fashion. The transmission is delayed for only a brief moment.

The subscriber 23 detects its address D0 in the region 30 and begins to receive.

The clock pulse generator 20 receives the bit group, generated by it and now occupied in the region 30 with the transmission data from the subscriber 21, with a delay dependent on the size of the network. The contents of the received region 30 (together with the remaining contents of the bit group in which the region 30 is contained) are copied into the region 31 for asynchronous data of the next bit group, as indicated by hatched arrows. For this purpose, the clock pulse generator 20 has an intermediate memory of appropriate size.

The subscriber 21 then overwrites the data D0, D1 and D2 with successor data D3, D4 and D5. Assuming that this is the last part of the data to be sent, the subscriber 21 resets the bit 34 to "0", in order to signal that the region for asynchronous data of the next bit group is available again for transmission to other subscribers.

The bit group is then transmitted from the subscriber 22 without change in the region 31 to the receiving subscriber 23, and from there to the clock pulse generator 20, which copies the contents of the region 31 into the region 32 of the next bit group generated by it. When the subscriber 21 receives this bit group, it resets the "occupied" identifier to "free". This prevents this bit group from always circulating in the system as being occupied with asynchronous data if the clock pulse generator 20, as in this example, basically copies the contents of the last received bit group into the next bit group, without evaluating the contents thereof. The transmission of the complete data packet takes a time t.

FIG. 4 shows the regions 30, 31, 32 and 33 for asynchronous data in the successive bit groups, as they are seen by the individual subscribers in the transmission of FIG. 3.

Figure 5:
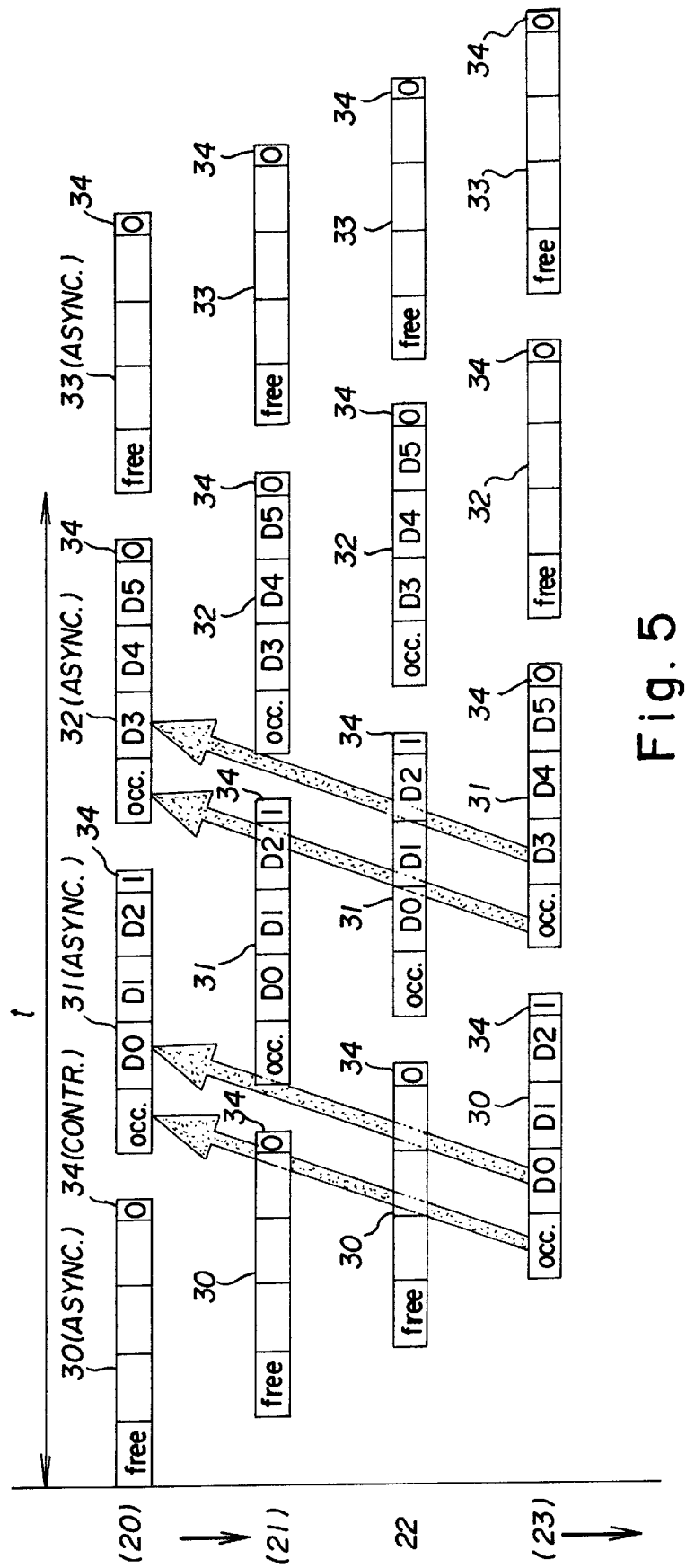
FIG. 5 is a timing diagram representing the transmission of a data packet from one network subscriber to another network subscriber of the network of FIG. 2, the transmission of the data packet being performed via the clock pulse generator.

FIG. 5 represents the case in which the transmission link leads from the transmitter, in this case the subscriber 23, to the receiver, which is the subscriber 21 in this case, via the clock pulse generator 20. The clock pulse generator 20 again generates a bit stream which contains no asynchronous data. The subscribers 21 and 22 detect the free region 30 and check their own respective transmit status. Since there is no transmit request in the case of the two subscribers 21 and 22, they relay the bit group with the region 30 in a transparent fashion.

The subscriber 23 would like to transmit, however, for which reason it sets the "occ." identifier (=occupied) and begins to transmit data immediately. Since the dataset to be transmitted is larger than the number of free bits which is contained in a region for asynchronous data of a bit group, the bit 34 is set to "1".

The clock pulse generator 20 receives the bit group generated by it and now occupied in the region 30 with the transmission data from the subscriber 21, with a delay dependent on the size of the network. The contents of the received region 30 of the re-received bit group are copied, as in the example of FIG. 3, into the region 31 for asynchronous data of the next bit group generated.

The subscriber 21 detects the occupied region 31 delayed by a bit group with reference to the clock pulse generator 20, detects its address D0 and begins receiving.

When the subscriber 23 transmits the last part of its data, it resets the bit 34 to "0", in order to signal that the region for asynchronous data of the next bit group is available again for transmission to other subscribers.

The subscriber 23 receives the data transmitted by it in the region 32 of the next bit group, into which they have been copied from the clock pulse generator 20, and resets its "occupied" identifier to "free". Just as in the example of FIG. 3, the bit group with the free region is detected with a delay of one bit group.

FIG. 6 shows the regions 30, 31, 32 and 33 for asynchronous data in the successive bit groups, as they are seen by the individual subscribers in the case of the transmission of FIG. 5.

In the cases in which the data are not transmitted via the clock generator 20 (FIGS. 3 and 4), a subscriber detects a message intended for it in the same bit group into which it is inserted by a transmitting subscriber, and in the cases in which the data are transmitted via the clock pulse generator 20 (FIGS. 5 and 6), a subscriber detects a message intended for it in bit groups following thereupon.

Figure 7:
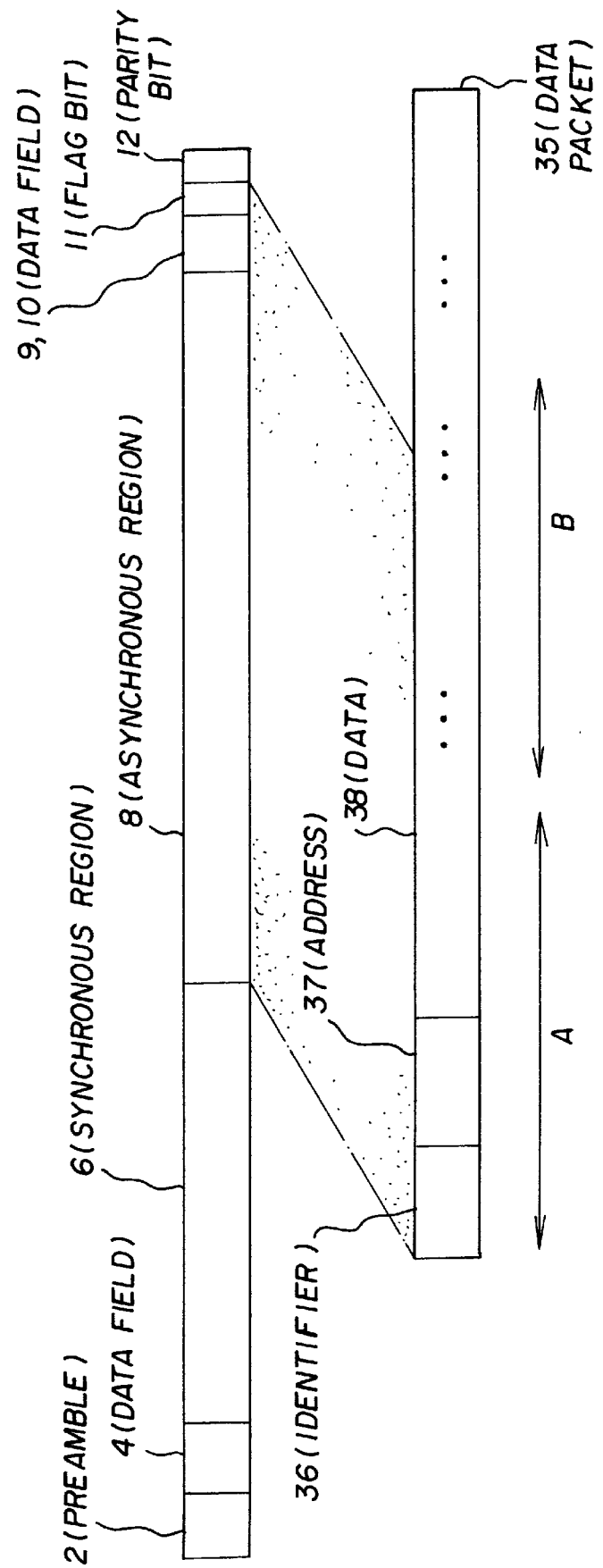
FIG. 7 is a diagrammatic view illustrating a division of a long data packet into successive bit groups.

FIG. 7 shows a data packet 35 which contains a free/occupied identifier 36, an address 37 and data 38, and which is longer than the region 8 for asynchronous data of a bit group, which corresponds to the bit group 1 of FIG. 1. The data packet 35 is divided into portions A, B, . . . whose length corresponds at most to the length of a region 8 for asynchronous data. The individual portions are inserted into one bit group in each case, as is shown diagrammatically. In addition, the bit position 11 is set to "1" within each bit group so long as the data packet 35 has not yet been accommodated completely in bit groups. Upon complete transmission of the entire packet 35 (in portions A, B, . . . ) the bit position 11 is set back to "0".

We claim:

1. A method for the common transmission of digital source data and control data between data sources and data sinks, which are subscribers to a communication network with a ring structure, the method which comprises:

transmitting source data and control data in a continuous data stream synchronized to a clock signal and in a format which prescribes a pulsed sequence of individual bit groups of equal length in which specific bit positions are reserved for source data and control data;

defining data packets each having a start and a defined length, and carrying a subscriber address;

reserving an arbitrarily large contiguous region of the bit positions for the source data within a bit group and transmitting the data packets within the contiguous region.

2. The method according to claim 1, wherein the defining step comprises assigning the subscriber address to the start of a respective data packet.

3. The method according to claim 1, which comprises writing, with a subscriber sending data packets, successive bits of a data packet to be transmitted in adjacent bit positions within the contiguous region.

4. The method according to claim 3, wherein the defining step comprises defining a data packet with more bit positions than the contiguous region of a given bit group and wherein the writing step comprises writing the data packet into a plurality of successive bit groups.

5. The method according to claim 4, which comprises setting a flag in a bit group in which data of a data packet are transmitted which is continued in a subsequent bit group, the flag indicating that the data packet is continued in the subsequent bit group.

6. The method according to claim 5, which further comprises defining regions for the control data in each bit group, and reserving one or more specific bit positions for the flag in each bit group within the regions for the control data.

7. The method according to claim 1, which comprises reserving a contiguous region of bit positions for the source data which are transmitted in a continuous data stream, and wherein the region for the source data which are transmitted in a continuous data stream and the region for the data which are transmitted in data packets adjoin one another.

8. The method according to claim 7, wherein the region for the source data which are transmitted in a continuous data stream and the region for the data which are transmitted in data packets are formed together by a fixed number of bit positions within a bit group.

9. The method according to claim 8, which further comprises permanently setting a boundary between the region for the source data which are transmitted in a continuous data stream and the region for the data which are transmitted in data packets.

10. The method according to claim 8, which further comprises setting a boundary between the region for the source data which are transmitted in a continuous data stream and the region for the data which are transmitted in data packets in real-time operation in accordance with a currently required transmission capacity.

11. The method according to claim 10, wherein the setting step comprises giving priority to source data which are transmitted in a continuous data stream.

12. The method according to claim 7, which comprises providing each bit group with a data field for information relating to a size of the region for source data in the continuous data stream or the size of the region for the data in the data packets.

13. The method according to claim 7, which further comprises subdividing the region within a bit group for the source data which are transmitted in a continuous data stream into a plurality of component bit groups of equal length, and assigning the source data allocated to each component bit group to a specific subscriber as a function of the control data.

14. The method according to claim 1, which further comprises sending a data packet with a given subscriber, and deleting or overwriting the data packet with new data by the given subscriber after the data packet has traversed the ring-shaped network and arrived at the given subscriber.

15. The method according to claim 1, wherein each bit group is defined with a region for asynchronous data transfer, and wherein the region for asynchronous data transfer includes a data field at a start of the region indicating whether the given bit group is occupied with asynchronous data or free.

16. The method according to claim 15, which further comprises writing, with a specific subscriber, a flag into the data packets, and deleting an identifier of a bit group as being occupied with asynchronous data when two data packets with the same flag are detected.

17. The method according to claim 16, wherein a subscriber providing a clock pulse is defined as the specific subscriber.

18. The method according to claim 1, wherein a complete bit group is defined with 64 bytes.

19. The method according to claim 1, which further comprises forming a block by combining sixteen successive bit groups.

20. The method according to claim 1, which comprises defining a preamble in each bit group within a region reserved for the control data, the preamble being a data field identifying a start of the bit group, a start of a block of bit groups, or an assignment between partial bit groups and specific subscribers.

21. The method according to claim 1, which comprises defining sixteen control bits within each bit group in the region reserved for the control data, and combining the control bits of sixteen successive bit groups to form a control message.

22. The method according to claim 1, which further comprises defining a parity identifier in a bit position in each bit group within the region reserved for the control data.

23. The method according to claim 1, which further comprises defining in each bit group, within a region reserved for the control data, a data field with a plurality of bits, the data field containing a numerical value corresponding to a position of a respective subscriber in the ring-shaped communication network.

24. The method according to claim 1, wherein the subscribers are connected via optical fibers and the transmitting step comprises transmitting through the optical fibers.

25. The method according to claim 1, wherein the communication network is a stationary communication system and the transmitting step comprises transmitting data among subscribers in the stationary communication system.

26. The method according to claim 1, wherein the communication network is a mobile communication system and the transmitting step comprises transmitting data among subscribers in the mobile communication system.

27. The method according to claim 26, wherein the mobile communication system is a communication system in a motor vehicle.

* * * * *